United States Patent [19]

Yamashita et al.

[11] Patent Number: 5,050,455
[45] Date of Patent: Sep. 24, 1991

[54] METHOD OF CONTROLLING CONTINUOUS VARIABLE TRANSMISSION

[75] Inventors: Yoshinori Yamashita; Sadayuki Hirano, both of Shizuoka; Takumi Tatsumi; Hiroaki Yamamoto, both of Hyogo, all of Japan

[73] Assignees: Suzuki Jidosha Kogyo Kabushiki Kaisha, Shizouka; Mitsubishi Denki Kabushiki Kaisha, Tokyo, both of Japan

[21] Appl. No.: 588,614

[22] Filed: Sep. 26, 1990

[30] Foreign Application Priority Data

Sep. 30, 1989 [JP] Japan .................................. 1-256343
Jan. 31, 1990 [JP] Japan .................................. 2-21727

[51] Int. Cl.$^5$ ............................................. B60K 41/12
[52] U.S. Cl. ........................................................ 74/866
[58] Field of Search ................. 74/867, 868, 866, 869; 364/424.1

[56] References Cited

U.S. PATENT DOCUMENTS

| | | | |
|---|---|---|---|
| 4,569,254 | 2/1986 | Itoh et al. ............................... | 74/866 |
| 4,701,853 | 10/1987 | Osanai ............................. | 364/424.1 |
| 4,753,133 | 6/1988 | Itoh et al. ............................... | 74/866 |
| 4,827,803 | 5/1989 | Miyawaki ........................ | 74/868 X |
| 4,846,019 | 7/1989 | Kumura ............................ | 74/866 X |
| 4,853,858 | 8/1989 | Kumura ............................ | 74/866 X |
| 4,858,497 | 8/1989 | Kouro ................... | 364/424.1 X |
| 4,916,982 | 9/1990 | Suzuki ............................ | 74/867 X |
| 4,976,169 | 12/1990 | Sasajima et al. ...................... | 74/866 |

FOREIGN PATENT DOCUMENTS 57-186656 11/1982 Japan .
59-43249 3/1984 Japan .
59-77159 5/1984 Japan .
61-233256 10/1986 Japan .

Primary Examiner—Dwight Diehl
Attorney, Agent, or Firm—Flynn, Thiel, Boutell & Tanis

[57] ABSTRACT

A method of controlling a continuously variable transmission which includes a fixed pulley member and a movable pulley member supported relative to the fixed pulley member so as to be movable both toward and away from the fixed pulley member, including the steps of decreasing and increasing the width of a groove defined between the pulley members to thereby respectively increase and decrease a rotational radius of a belt which is received between the pulley members in the groove. When a target engine rotational speed based on throttle opening degree and vehicle velocity changes during vehicle running, a transient speed change control is performed so as to change a belt ratio of the transmission based on a predetermined rate limit value. A control unit is provided for receiving the throttle opening degree and vehicle velocity and executing the transient speed change control. During execution of the transient speed change control, the rate limit value is changed in accordance with the throttle opening degree and vehicle velocity, the throttle opening is changed on the basis of vehicle velocity, and the final target engine rotational speed is changed on the basis of the rate limit value. A time limit for execution of transient control is set on the basis of the throttle opening degree and the vehicle velocity.

2 Claims, 5 Drawing Sheets

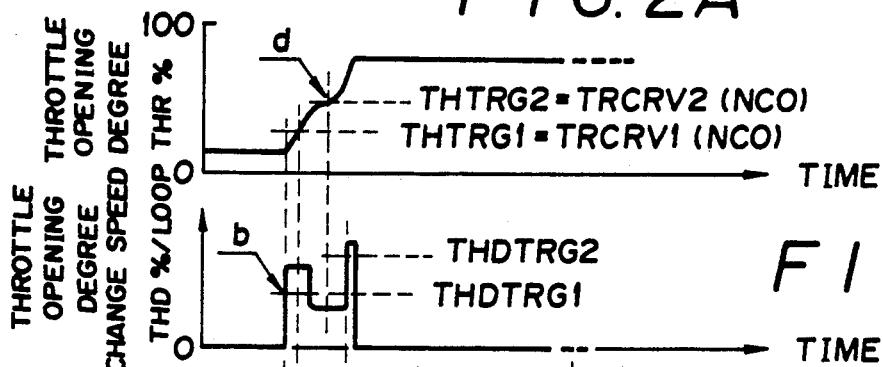
FIG. 2A
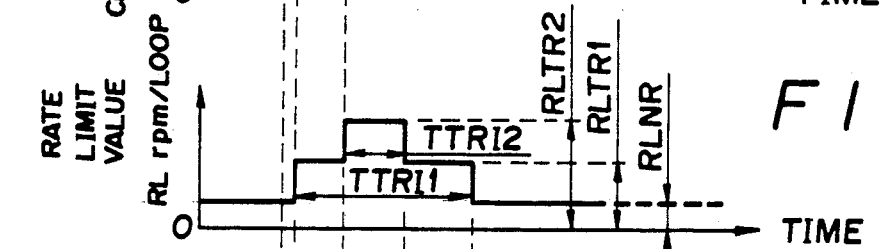
FIG. 2B
FIG. 2C
FIG. 2D
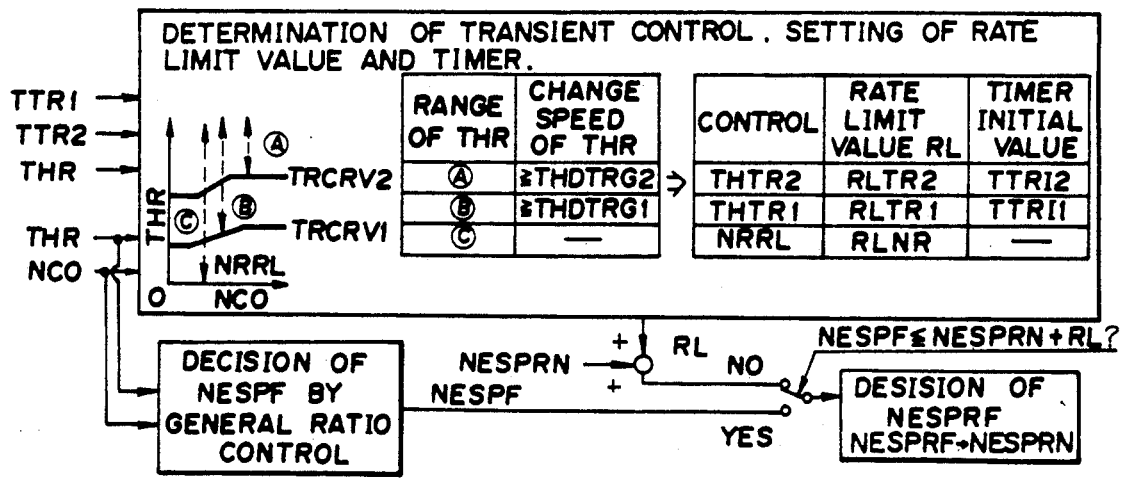
FIG. 3

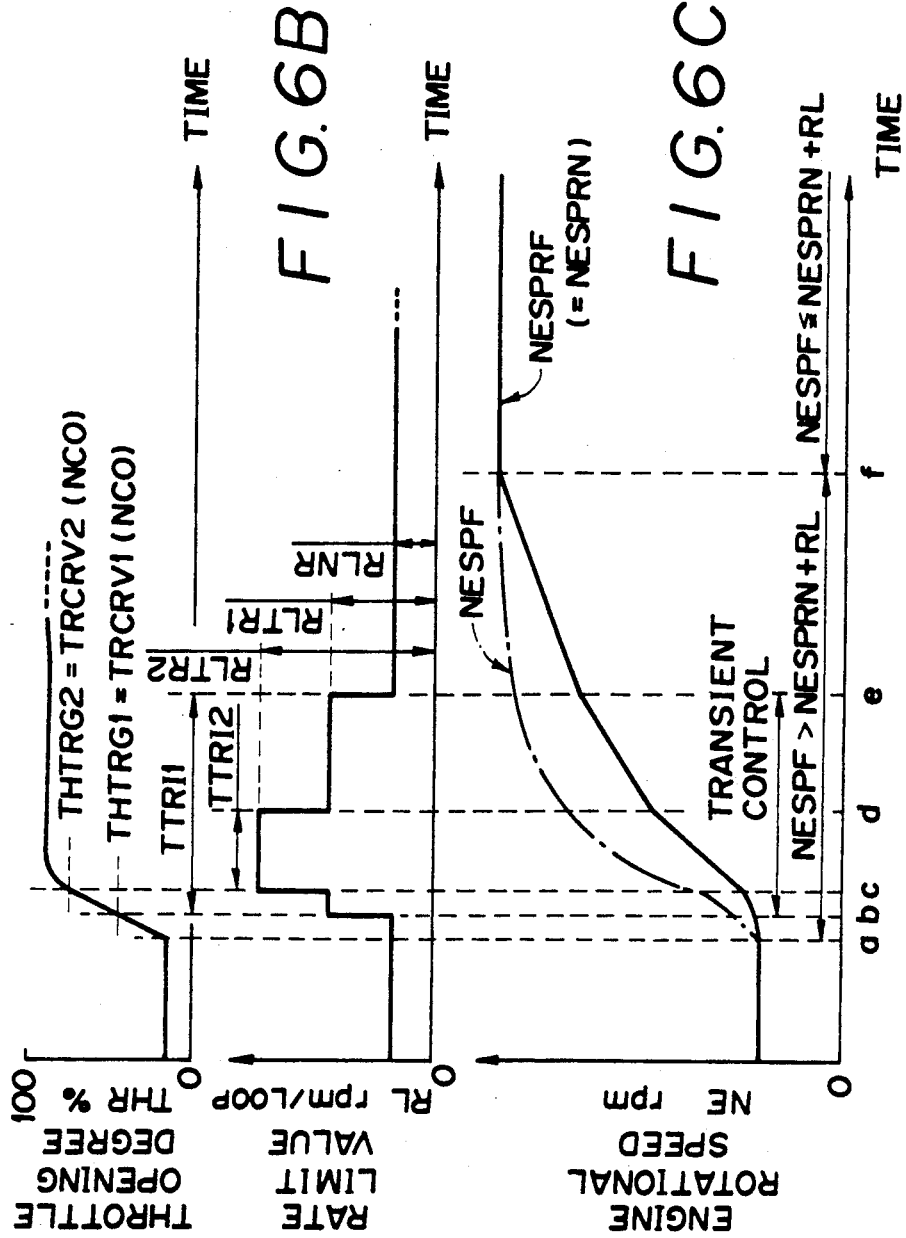

METHOD OF CONTROLLING CONTINUOUS VARIABLE TRANSMISSION

FIELD OF THE INVENTION

The present invention relates to a method of controlling a continuous variable transmission in which in the case where (1) an actual throttle opening degree is equal to or larger than a throttle opening degree trigger value which is determined based on vehicle velocity and throttle opening degree, and (2) a change speed of the throttle opening degree is equal to or larger than a throttle opening degree change speed trigger value, the throttle transient control is started so as to change a final target engine rotational speed on the basis of a rate limit value larger than a predetermined rate limit value.

BACKGROUND OF THE INVENTION

In vehicles, a transmission is arranged between an internal combustion engine and driving wheels. The transmission changes a driving force of the driving wheels and a running speed in accordance with running conditions of the vehicle which change in a wide range, thereby making the performance of the internal combustion engine sufficiently effective. There is known a continuous variable transmission in which a pulley has a fixed pulley member fixed to a rotary shaft and a movable pulley member attached to a rotary shaft so as to move toward and away from the fixed pulley member, and by increasing and decreasing the width of a groove which is formed between both of the pulley members, a rotational radius of a belt which is reeved to the pulley is respectively decreased and increased, thereby changing the belt ratio. Such a continuous variable transmission has been disclosed in, for instance, JP-A-57-186656, JP-A-59-43249, JP-A-59-77159, and JP-A-61-233256.

In the control of such continuous variable transmission, when a final target engine rotational speed changes during ordinary vehicle running, if the difference between target engine rotational speed and the final target engine rotational speed is equal to or larger than a predetermined value, a rate limit control operation is executed, in which the final target engine rotational speed is changed on the basis of a predetermined rate limit value. Such rate limit control is disclosed in U.S. Pat. No. 5,012,697. However, when the vehicle running mode is changed during running or when a throttle opening degree THR is increased to a value near the fully open position, the required change in final target engine rotational speed is large, so that there occurs an inconvenience in that it is impossible to cope with such a situation using the ordinary rate limit value.

Therefore, the applicant of the present invention has already developed an apparatus for controlling the rotational speed of a continuous variable transmission in which when the running mode was changed during running or when the throttle opening degree THR was increased to a value near the fully open position, there is executed a transient control to set a time change ratio (as a rate limit value) to be larger than a predetermined time change ratio (as a predetermined rate limit value), and the final target engine rotational speed is changed, thereby improving the response speed of the engine rotational speed (Japanese Patent Application No. 63-302733).

However, in the conventional method of controlling a continuous variable transmission, there is an inconvenience in that when the actual throttle opening degree THR is equal to or larger than a predetermined throttle opening degree trigger value which is determined on the basis of vehicle velocity and throttle opening degree, the throttle transient control is started, so that the will of the driver is not reflected in the control of the vehicle speed.

For instance, in running on high ground (high elevations), since the engine torque decreases due to the influence of low atmospheric pressure, if the engine torque is not held to a high value by increasing the throttle opening degree, running similar to that at lower elevations cannot be performed. Thus, even in a situation in which the throttle transient control is unnecessary, there is a problem in that since the throttle opening degree crosses the throttle opening degree trigger value, the throttle transient control is executed in spite of the will of the driver. On the other hand, there is a problem in that in the running on high ground, in order to achieve adequate engine torque, the throttle opening degree will nearly always exceed the throttle opening degree trigger value. Thus, the actual throttle opening degree cannot cross the throttle opening degree trigger value, so that the throttle transient control is not executed even in a situation in which it is necessary.

Such problems occur not only in the running on a high ground but also when running on slopes, during high speed running, or the like. There is also a problem such that if the throttle opening degree trigger value is set to a predetermined value, when the throttle opening degree THR has slightly exceeded the throttle opening degree trigger value, the engine rotational speed instantaneously rises.

Therefore, there occur inconveniences such as improper execution of the throttle transient control, excessive engine rotational speed, and the like, so that the will of the driver is not reflected in the rotational speed control and a feeling of physical disorder is given to the driver.

If a predetermined trigger value is set and used irrespective of the running state of the vehicle, since the throttle opening degree THR is small in a low velocity range but large in a high velocity range, it is difficult to actuate throttle transient control using a single trigger value, making it difficult to achieve the throttle transient effect at all possible velocities.

Further, unlike the case of the low velocity range, since the throttle opening degree THR is large in a high velocity range, the predetermined throttle transient control is executed frequently, and more than it is needed, such that the running state deteriorates.

SUMMARY OF THE INVENTION

The invention relates to a method of controlling a continuous variable transmission in which the will of the driver can be reflected and in which proper throttle transient control can be adapted to the running state of the vehicle. Such a method includes providing a control unit which receives a throttle opening degree signal and a vehicle velocity signal and executes a speed change control so as to change a final target engine rotational speed, and changing a rate limit value at the time of a transient control in accordance with the throttle opening degree signal and the vehicle velocity signal which are input to the control unit. The throttle opening degree signal when executing the transient control is changed on the basis of the vehicle velocity signal, a limit time of the transient control is set on the basis of the throttle opening degree and the vehicle velocity signals, the final target engine rotational speed at the time of the transient control is changed on the basis of the rate limit value, and the proper transient control adapted to the running state of the vehicle can be accomplished by the control unit.

To accomplish the above, according to the invention, in a method of controlling a continuous variable transmission, whenever there is a change in target engine rotational speed which is calculated on the basis of a vehicle velocity signal and a throttle opening degree signal during vehicle running, a speed change control is performed so as to change the belt ratio by executing a rate limit control using a predetermined rate limit value, and the control method is characterized in that there is provided a control unit for receiving the vehicle velocity signal and the throttle opening degree signal and for executing a throttle transient control so as to change a final target engine rotational speed on the basis of a rate limit value which is larger than the predetermined rate limit value. The throttle transient control is started by the control unit when (1) the actual throttle opening degree is equal to or larger than a throttle opening degree trigger value which is determined on the basis of the vehicle velocity and throttle opening degree, and (2) a change speed of the throttle opening degree is equal to or larger than a throttle opening degree change speed trigger value.

By operating as mentioned above, in the case where the actual throttle opening degree is equal to or larger than the throttle opening degree trigger value and where the change speed of the throttle opening degree is equal to or larger than the throttle opening degree change speed trigger value, by starting the throttle transient control by the control unit, the throttle transient control can be properly and effectively executed.

BRIEF DESCRIPTION OF THE DRAWINGS

An embodiment of the present invention will be described in detail hereinbelow on the basis of the drawings, in which:

FIGS. 2A-2D are timing charts which illustrate control of the continuous variable transmission by the control loop of FIG. 1;

FIG. 3 is a block diagram of the control apparatus according to the invention;

FIGS. 6A-6C are timing diagrams which illustrate the control operation performed by the control loop of FIG. 5.

DETAILED DESCRIPTION

Figure 4:
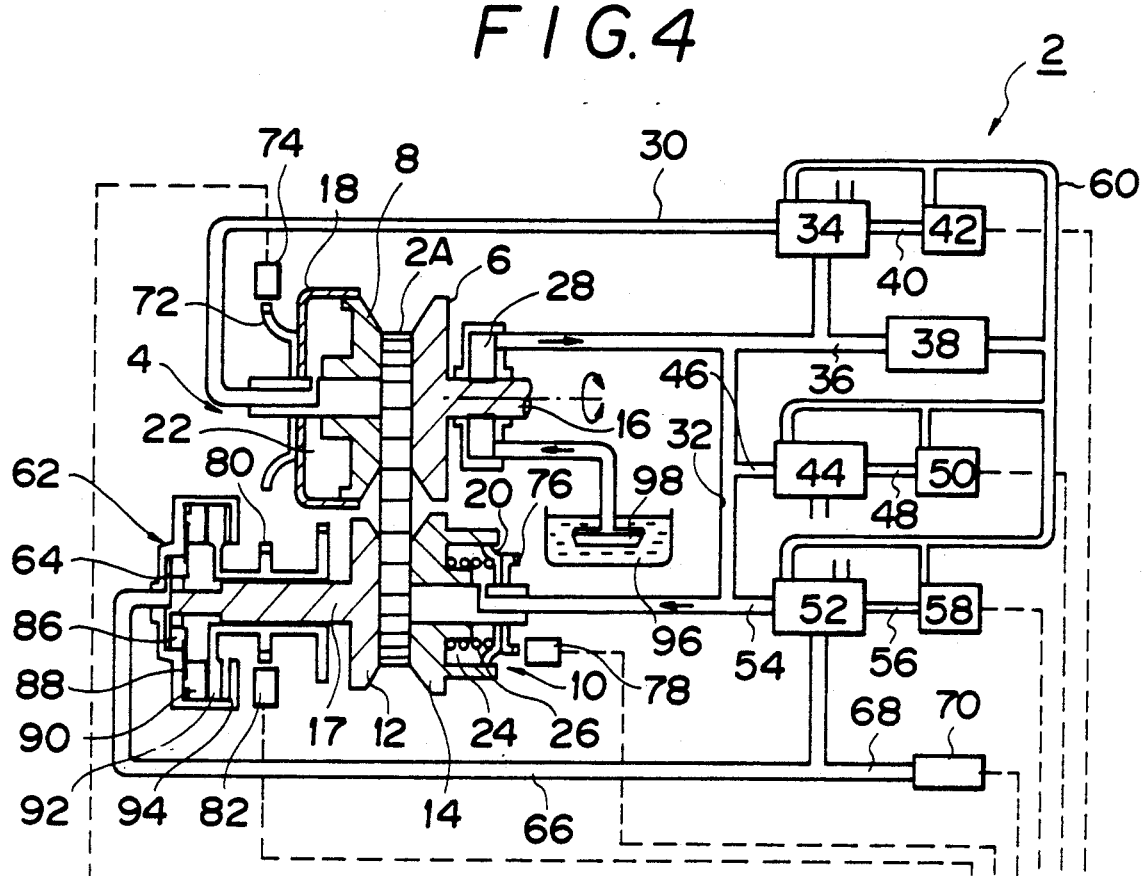
FIG. 4 is a block diagram of the continuous variable transmission.

FIGS. 1 to 4 show an embodiment of the invention. In FIG. 4, reference numeral 2 denotes a belt drive type continuous variable transmission; 2A indicates a belt; 4 a driving side pulley having a driving side fixed pulley member 6 and a driving side movable pulley member 8; and 10 a driven side pulley having a driven side fixed pulley member 12; and a driven side movable pulley member 14. The driving side pulley 4 has the driving side fixed pulley member 6 which is fixed to a rotary shaft 16 and the driving side movable pulley member 8 which is attached to the rotary shaft 16 so as to be movable in the axial direction of the rotary shaft 16 and rotatable relative thereto. On the other hand, the driven side pulley 10 also has a rotary shaft 17, and the driven side fixed pulley member 12, and the driven side movable pulley member 14 are arranged on the shaft 17 in a manner similar to the driving side pulley 4.

First and second housings 18 and 20 are attached to the driving side movable pulley member 8 and the driven side movable pulley member 14, respectively, so that first and second hydraulic chambers 22 and 24 are formed. Pressing means 26 comprising a spring or the like is provided in the second hydraulic chamber 24 for pressing the second housing 20 so as to enlarge the second hydraulic chamber 24.

An oil pump 28 is provided for the rotary shaft 16. The oil pump 28 is communicated with the first and second hydraulic chambers 22 and 24 by first and second oil passages 30 and 32, respectively. A primary pressure control valve 34 as a speed change control valve to control a primary pressure as an input shaft sheave pressure is arranged in series with the first oil passage 30. A constant pressure control valve 38 to control a line pressure (generally, 5 to 25 kg/cm$^2$) to a predetermined pressure (3 to 4 kg/cm$^2$) is communicated with the first oil passage 30 between the oil pump 28 and the primary pressure control valve 34 by a third oil passage 36. A first three-way electromagnetic valve 42 to control a primary pressure is communicated with the primary pressure control valve 34 by a fourth oil passage 40.

A line pressure control valve 44 having a relief valve function to control a line pressure as a pump pressure is communicated with the second oil passage 32 by a fifth oil passage 46. A second three-way electromagnetic valve 50 to control the line pressure is communicated with the line pressure control valve 44 by a sixth oil passage 48.

Further, a clutch pressure control valve 52 to control a clutch pressure is communicated with the second oil passage 32 by a seventh oil passage 54 between the second hydraulic chamber 24 and the line pressure control valve 44. A third three-way electromagnetic valve 58 to control the clutch pressure is communicated with the clutch pressure control valve 52 by an eighth oil passage 56.

The primary pressure control valve 34, the first electromagnetic valve 42, the constant pressure control valve 38, the line pressure control valve 44, the second electromagnetic valve 50, the clutch pressure control valve 52, and the third electromagnetic valve 58 are communicated with each other by a ninth oil passage 60.

The clutch pressure control valve 52 is communicated with a clutch hydraulic chamber 64 of a hydraulic clutch 62 by a tenth oil passage 66. A pressure sensor 70 is communicated with the tenth oil passage 66 by an eleventh oil passage 68. The pressure sensor 70 can directly detect the oil pressure when controlling the clutch pressures in the holding mode, starting mode, and the like. The pressure sensor 70 is used to detect oil pressure and to help set the detected oil pressure to a target clutch pressure. On the other hand, in the driving mode, since the clutch pressure is equal to the line pressure, the pressure sensor 70 is also used in line pressure control.

An input shaft rotation detecting gear 72 is arranged on the outside of the first housing 18. A first rotation detector 74 is arranged near the outer peripheral portion of the input shaft rotation detecting gear 72. On the other hand, an output shaft rotation detecting gear 76 is arranged on the outside of the second housing 20. A second rotation detector 78 is arranged near the outer peripheral portion of the output shaft rotation detecting gear 76. Detection signals from the first and second rotation detectors 74 and 78 are input to a control unit 84, which will be explained hereinafter, thereby obtaining the engine rotational speed and the belt ratio.

A gear 80 is provided to transfer an output from the hydraulic clutch 62. A third rotation detector 82 to detect the rotation of the final output shaft is arranged near the outer peripheral portion of the gear 80. That is, the third rotation detector 82 detects the rotation of the final output shaft which is directly coupled with a reduction gear, a differential apparatus, a driving shaft, and tires, and can therefore detect the vehicle velocity. The rotational speeds at both the input and output of the hydraulic clutch 62 can be detected using the second and third rotation detectors 78 and 82. Those detectors thus contribute together to the detection of a clutch slip amount.

Referring to FIG. 4, reference numeral 86 denotes a piston of the hydraulic clutch 62; 88 indicates a ring-shaped spring; 90 a first pressure plate; 92 a friction plate; 94 a second pressure plate; 96 an oil pan; and 98 an oil filter.

As shown in FIG. 4, in the belt drive type continuous variable transmission 2, the oil pump 28 locating on the rotary shaft 16 operates in accordance with the driving of the rotary shaft 16. The oil is sucked from the oil pan 96 in the bottom portion of the transmission through the oil filter 98. The line pressure as a pump pressure is controlled by the line pressure control valve 44. When leakage from the line pressure control valve 44 is large (i.e. when a large amount of oil is discharged therefrom), the line pressure decreases. Conversely, when the amount of oil discharged from the valve 40 decreases, the line pressure increases.

The control unit 84 receives signals which correspond to various conditions such as throttle opening degree of a carburetor (not shown) of the vehicle, along with signals representing engine rotational speed, vehicle velocity, and the like from the first to third rotation detectors 74, 78, and 82. The opening and closing operations of the electromagnetic valves 42, 50 and 58 are controlled by the control unit 84, thereby performing the speed change control. The control unit 84 receives signals from and controls the pressure sensor 70.

As will be apparent from the following discussion, the control unit 84 may be embodied as a conventional microprocessor circuit.

Various kinds of signals which are input to the control unit 84 and the functions of the input signals will now be described in detail.

(1) Detection signal of the shift lever position:
The line pressure and the ratio which are required in each range and the clutch are controlled by each range signal of P, R, N, D, L, and the like.

(2) Detection signal of the carburetor throttle opening degree:
Based on this signal, the control unit 84 determines engine torque from a memory in which data has previously been input, and the target belt ratio or the target engine rotational speed is decided.

(3) Detection signal of the carburetor idling position:
The carburetor throttle opening degree sensor is corrected and the accuracy in the control is improved.

(4) Acceleration pedal signal:
The will of the driver is detected on the basis of a depressing state of the acceleration pedal and the appropriate control upon running or starting of the vehicle is determined.

(5) Brake signal:
The presence or absence of the depressing operation of the braking pedal is detected and the appropriate control such as disconnections of the clutch or the like is determined.

(6) Power mode option signal:
This signal is used as an option to set the performance of the vehicle into the sporty (high performance) mode or the economical mode.

The control unit 84 receives the vehicle velocity and the throttle opening degree signals and executes a throttle transient control so as to change a final target engine rotational speed on the basis of a rate limit value which is larger than a predetermined rate limit value. The throttle transient control is started when (1) the actual throttle opening degree is equal to or larger than a throttle opening degree trigger value which is determined on the basis of the vehicle velocity and the throttle opening degree, and (2) a change speed of the throttle opening degree is equal to or larger than a throttle opening degree change speed trigger value.

The control unit 84 changes the rate limit value at the time of the throttle transient control in accordance with the vehicle velocity and the throttle opening degree which are input, and changes the throttle opening degree when the throttle transient control is executed on the basis of the vehicle velocity. The control unit 84 sets the longest time of the throttle transient control on the basis of the vehicle velocity and the throttle opening degree, and changes the final target engine rotational speed at the time of the throttle transient control by the rate limit value, thereby executing the proper speed change control adapted to the running state of the vehicle.

As shown in FIG. 3, the control unit 84 receives a clutch output rotational speed NCO as an indicator of vehicle velocity, and receives the throttle opening degree THR of the carburetor (not shown) and shifts the control mode from a rate limit control NRRL based on an ordinary rate limit value RLNR to first and second throttle transient controls THTR1 and THTR2 based on first and second rate limit values RLTR1 and RLTR2 which were divided into, for instance, two kinds of values.

That is, first and second throttle trigger curves TRCRV1 and TRCRV2 for the throttle transient control are defined on the basis of the vehicle velocity NCO and the throttle opening degree THR. The first throttle transient control is started in the case where the throttle opening degree THR is equal to or larger than the predetermined first throttle opening degree trigger value THTRG1 (FIG. 2A) and where the change speed THD of the throttle opening degree THR is equal to or larger than the first throttle opening degree change speed trigger value THDTRG1 (FIG. 2B). On the other hand, the second throttle transient control is started in the case where the throttle opening degree THR is equal to or larger than the predetermined second throttle opening degree trigger value THTRG2 and where the change speed THD of the throttle opening degree THR is equal to or larger than the second throttle opening degree change speed trigger value THDTRG2.

That is, in the case where the relations among the throttle opening degree THR, the first throttle opening degree trigger value THTRG1, and the first throttle opening degree trigger curve TRCRV1 (NCO) satisfy THR≧THTRG1=TRCRV1 (NCO), and where the relation between the change speed THD of the throttle opening degree THR and the first throttle opening degree change speed trigger value THDTRG1 satisfies THD≧THDTRG1, then the first throttle transient control THTR1 is executed, and the longest time of the first throttle transient control THTR1 is set to TTRI1 on the basis of the vehicle velocity NCO and the throttle opening degree THR.

On the other hand, in the case where the relations among the throttle opening degree THR, the second throttle opening degree trigger value THTRG2, and the second throttle opening degree trigger curve TRCRV2 (NCO) satisfy THR≧THTRG2=TRCRV2 (NCO), and where the relation between the change speed THD of the throttle opening degree THR and the second throttle opening degree change speed trigger value THDTRG2 satisfies THD≧THDTGR2, then the second throttle transient control THTR2 is executed and the longest time of the second throttle transient control THTR2 is set to TTRI2 on the basis of the vehicle velocity NCO and the throttle opening degree THR.

At this time, the first throttle opening degree trigger value THTRG1 and the second throttle opening degree trigger value THTRG2 are preset so as to satisfy the relation of THTRG1<THTRG2 and are set so as to execute the first throttle transient control THTR1 at a small throttle opening degree THR.

The control of the continuous variable transmission 2 will now be described.

The continuous variable transmission 2 is controlled by the oil pressure. A proper line pressure to hold the belt and to transmit the torque, a primary pressure to change the belt ratio, and a clutch pressure to certainly couple the clutch are respectively assured in the transmission 2 by commands from the control unit 84.

The control of the continuous variable transmission 2 will be described according to the flowchart of FIG. 1.

A program to control the continuous variable transmission 2 is started (100) by the actuation of an internal combustion engine (not shown). A check is made to see if the running mode of the vehicle has been set to the driving mode (DRV MODE) or not (102). If NO in the discrimination (102), another belt ratio control (104) is to be executed and the processing routine ends (106).

If YES in the discrimination (102), there is executed a process (108) for determining the first throttle opening degree trigger value THTRG1 from the first throttle opening degree trigger curve TRCRV1 (NCO) and for deciding the second throttle opening degree trigger value THTRG2 from the second throttle opening degree trigger curve TRCRV2 (NCO).

Then, a check is made to see if the relation between the throttle opening degree THR and the second throttle opening degree trigger value THTRG2 satisfies THR≧THTRG2 or not (110).

If YES in the discrimination (110), a check is made to see if the relation between the change speed THD of the throttle opening degree THR and the second throttle opening degree change speed trigger THDTRG2 satisfies THD≧THDTRG2 or not (112).

If YES in the discrimination (112), a process (114) to subtract "1" from a second throttle transient control timer TTR2 is executed.

If NO in the discrimination (110) and if NO in the discrimination (112), a process (116) to set the second throttle transient control timer value TTR2 to the second throttle transient control timer initial value TTRI2 is executed.

After the process (114) of the second throttle transient control timer TTR2, a check is made to see if the second throttle transient control timer TTR2 has been set to 0 or not (118). If NO in the discrimination (118), a check is made to see if the first throttle transient control timer TTR1 has been set to 0 or not (120). If NO in the discrimination (120), a process (122) to subtract "1" from the first throttle transient control timer TTR1 is executed.

After the process (122) of the first throttle transient control timer TTR1, a process (124) to set a rate limit value RL to the second rate limit value RLTR2 of the second throttle transient control THTR2 is executed. If YES in the discrimination (120), the process (122) is bypassed and the processing routine advances to the process (124).

Figure 1:
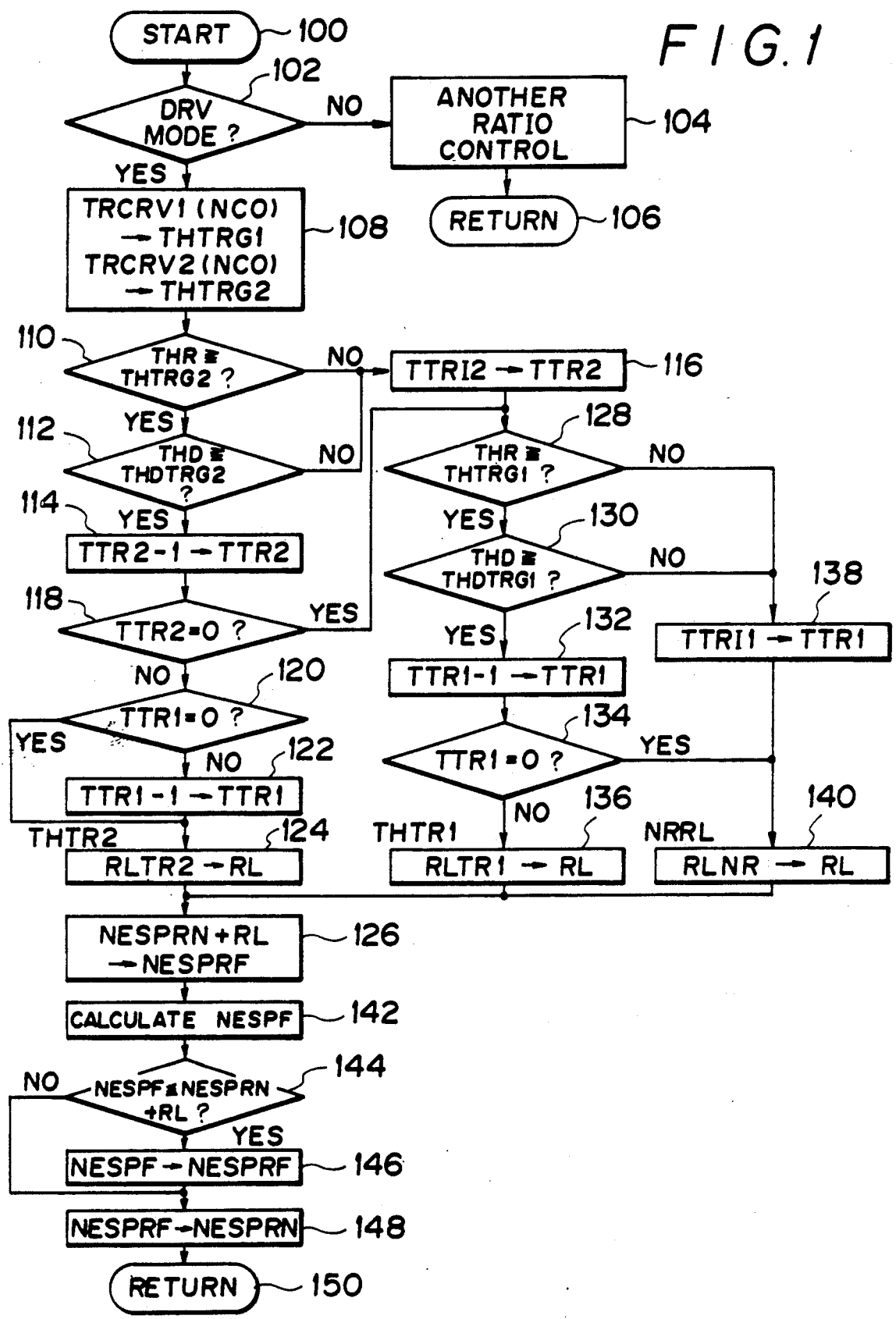
FIG. 1 is a flowchart which illustrates a control loop according to the present invention to control a continuous variable transmission.

After that, there is executed a process (126) for adding the rate limit value RL which was set to RLTR2 in the above process (124) to the final target engine rotational speed NESPRN which was determined during the preceding execution of the FIG. 1 control loop, thereby setting the final target engine rotational speed NEWPRF.

On the other hand, after the process (116) regarding the second throttle transient control timer TTR2, and also in the case of YES in the discrimination (118), a check is made to see if the relation between the throttle opening degree THR and the first throttle opening degree trigger value THTRG1 satisfies THR≧THTRG1 or not (128).

If YES in the discrimination (128), a check is made to see if the relation between the change speed THD of the throttle opening degree THR and the first throttle opening degree change speed trigger value THDTRG1 satisfies THD≧THDTRG1 or not (130).

If YES in the discrimination (130), a process (132) to subtract "1" from the first throttle transient control timer TTR1 is executed. A check is then made to see if the first throttle transient control timer TTR1 has been set to 0 or not (134).

If NO in the discrimination (134), a process (136) to set the rate limit value RL to the first rate limit value RLTR1 of the first throttle transient control THTR1 is executed. The processing routine advances to the process (126) for adding the rate limit value RL which was set to RLTR1 in the above process (136) to the final target engine rotational speed NESPRN which was determined during the preceding control loop, thereby setting the final target engine rotational speed NESPRF.

On the other hand, if NO in the discrimination (128) or if NO in the discrimination (130), a process (138) to set the first throttle transient control timer TTR1 to the first throttle transient control timer initial value TTRI1 is executed. After the process (138), and also if YES in the discrimination (134), a process (140) to set the rate limit value RL to the ordinary rate limit value RLNR in the ordinary rate limit control NRRL is executed. The processing routine then advances to the process (126) for adding the rate limit value RL which was set to RLNR in the above process (140) to the final target engine rotational speed NESPRN of the preceding control loop, thereby setting the final target engine rotational speed NESPRF.

After the process (126), a process (142) to calculate the target engine rotational speed NESPF by the general belt ratio control is performed. A check is made to see if the relation between the target engine rotational speed NESPF and the value NESPRN+RL satisfies NESPF≦NESPRN+RL or not (144).

If YES in the discrimination (144), a process (146) to set the final target engine rotational speed NESPRF equal to the target engine rotational speed NESPF is executed.

After the process (146), a process (148) sets the final target engine rotational speed NESPRN (which will be used in the next execution of the control loop) equal to NESPRF. If NO in the discrimination (144), the process (146) is bypassed and the processing routine advances to execute process (148), and then the control loop execution ends (150).

The control of the continuous variable transmission 2 by the control loop of FIG. 1 will be described according to the timing charts of FIGS. 2A-2D.

In FIG. 2, the case where the accelerator pedal was depressed at a low throttle opening degree THR, for instance, the kick-down operation, will now be described as an example.

In the general ratio control, an engine rotational speed NE is controlled to the final target engine rotational speed NESPRF which was calculated by the schedule. That is, the target engine rotational speed is determined from throttle opening degree and vehicle velocity based on a mapping of the target engine rotational speed versus throttle opening degree and vehicle velocity, and the final target engine rotational speed is obtained by applying a filtering process to the target engine rotational speed. As a result of that the throttle opening degree THR is increased, a change occurs in the final target engine rotational speed NESPRF, and if the difference between NESPRF and the target engine rotational speed NESPF which is obtained by executing a filtering process to the NESPF is equal to or larger than the ordinary rate limit value RLNR, the rate limit control NRRL is performed. The rate limit control NRRL is executed from point a in FIG. 2D.

Although the change speed THD of the throttle opening degree THR is equal to or larger than the first throttle opening degree change speed trigger value THDTRG1 at point b (FIG. 2B), since the throttle opening degree THR is less than the first throttle opening degree trigger value THTRG1 (FIG. 2A), the first throttle transient control is not started for an interval between a and b and the ordinary rate limit control NRRL is performed.

When the acceleration pedal is depressed and the time has reached point c (FIG. 2D), since the throttle opening degree THR is equal to or larger than the first throttle opening degree trigger value THTRG1 (FIG. 2A), the first throttle transient control THTR1 is started.

Even if the throttle opening degree THR is equal to or larger than the second throttle opening degree trigger value THTRG2 at point d (FIG. 2A) by further depressing the acceleration pedal, since the change speed THD of the throttle opening degree THR is less than the second throttle opening degree change speed trigger value THDTRG2, the second throttle transient control THTR2 is not started.

The second throttle transient control THTR2 is started from point e (FIG. 2D) when the change speed THD of the throttle opening degree THR is equal to or larger than the second throttle opening degree change speed trigger value THDTRG2. The second throttle transient control THTR2 is finished at point f (FIG. 2D) when the second throttle transient control timer initial value TTRI2 of the second throttle transient control timer TTR2 elapses. After that, only the first throttle transient control is executed.

The first throttle transient control THTR1 is finished at point g (FIG. 2D) when the first throttle transient control timer initial value TTRI1 of the first throttle transient timer TTR1 (which began operating at point c) elapses.

The ordinary rate limit control NRRL is executed from point g.

At point h, since the relation between the target engine rotational speed NESPF by the general ratio control and the value which is obtained by adding the ordinary rate limit value RL to the final target engine rotational speed NESPRN of the preceding control loop satisfies NESPF≦NESPRN+RL, the ratio control by schedule to control the engine rotational speed NE to the NESPF which was determined by the filter is executed.

As mentioned above, in the case where the actual throttle opening degree THR is equal to or larger than the throttle opening degree trigger value THTRG which is determined from the vehicle velocity NCO and the throttle opening degree, and where the change speed THD of the throttle opening degree THR is equal to or larger than the throttle opening degree change speed trigger value THDTRG, the control unit 84 starts the throttle transient control THTR, so that the throttle transient control THTR can be properly executed.

Therefore, it is possible to prevent the inconvenience such that the throttle transient control THTR is executed at the unnecessary time in the running on a high ground, running on a slope, high speed running, or the like. It is possible to avoid the inconvenience such that the throttle transient control THTR is not executed at the necessary time. Therefore, the throttle transient control THTR can be performed in a wider throttle opening degree region. It is possible to certainly prevent the occurrence of the inconveniences such as improper execution of the throttle transient control THTR, excessive engine rotational speed phenomenon, and the like. The will of the driver can be reflected in the rotational speed control. There is no feeling of physical disorder given to the driver. The fine control can be accomplished. The running performance can be improved.

On the other hand, by setting and using the throttle opening degree trigger value THTRG in accordance with the vehicle velocity NCO and the throttle opening degree THR which are input to the control unit 84, it is possible to enter the throttle transient control THTR in a low velocity range. An adequate throttle transient effect can be obtained. Also, the throttle transient control THTR is executed no more than it is needed in a high velocity range. The running performance can thus be improved.

Figure 5:
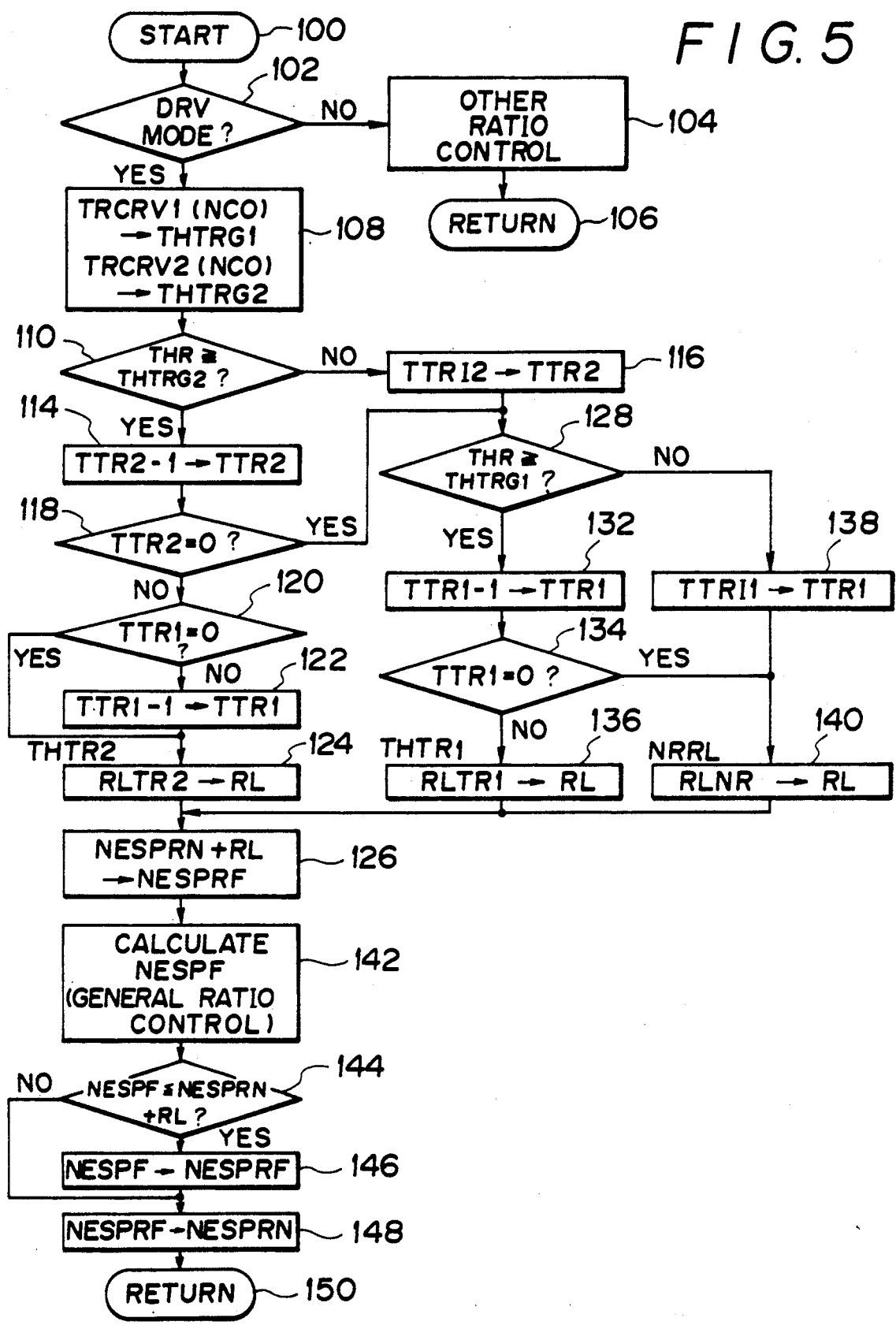
FIG. 5 is a flowchart which illustrates another control loop according to the invention.

FIG. 5 illustrates another example of a control loop according to the present invention. The control loop shown in FIG. 5 is identical to the control loop of FIG.

1, except the decision blocks 112 and 130 have been removed. More specifically, the determinations of whether the change speed THD equals or exceeds the trigger values THDTRG1 and THDTRG2 are not included in the FIG. 5 control loop, but the FIG. 5 control loop otherwise operates identically to FIG. 1. Thus, the transient controls THTR1 and THTR2 are invoked solely on the basis of whether the throttle opening degree THR equals or exceeds the respective throttle opening degree trigger values THTRG1 (128) and THTRG2 (110).

The control of the belt drive type continuous variable transmission 2 by the control loop of FIG. 5 will now be described according to the timing charts of FIGS. 6A-6C.

In the case of, for instance, the kick-down operation in which the acceleration pedal was depressed from a low throttle opening degree THR, in the general ratio control, the engine rotational speed NE is controlled to the final target engine rotational speed NESPF which was calculated by the schedule and was filter processed.

On the other hand, in the case where there is a change in target engine rotational speed NESPF by the general ratio control for the final target engine rotational speed NESPRN of the preceding control loop, when the difference between them is equal to or larger than the rate limit value RL, the rate limit control is performed.

That is, the ordinary rate limit control NRRL is executed between points a and b (FIG. 6C). At point b, the pedal was depressed and there is a relation of THR=THTRG1 between the throttle opening degree THR and the first trigger value THTRG1 (FIG. 6A). The first transient control THTR1 is therefore started at point b and performed between points b and c. At point c, there is a relation of THR=THTRG2 (FIG. 6A) between the throttle opening degree THR and the second trigger value THTRG2.

The second transient control THTR2 is therefore started at point c and is continuously executed between points c and d so long as there is not a relation of NESPF≦NESPRN+RLTR2 between the target engine rotational speed NESPF by the general ratio control and the value which is obtained by adding the second rate limit value RLTR2 to the final target engine rotational speed NESPRN from the preceding execution of the control loop, or so long as the time associated with the transient control timer TTRI2, does not elapse, or so long as there is not a relation of THR<THTRG2 between the throttle opening degree THR and the second trigger value THTRG2.

After TTRI2 expires at point d (FIG. 6B), the relation between the target engine rotational speed NESPF by the general ratio control and the value which is obtained by adding the first rate limit value RLTR1 to the final target engine rotational speed NESPRN of the preceding control loop does not satisfy NESPF-≦NESPRN+RLTR1, and the relation between the throttle opening degree THR and the first trigger value THTRG1 satisfies THR≧THTRG1. Therefore, the first transient control THTR1 is executed until point e, when the time associated with TTRI1 elapses from point b.

Although the first and second transient controls THTR1 and THTR2 are not performed between points e and f, the rate limit control is executed because the relation between the target engine rotational speed NESPF by the general ratio control and the value which is obtained by adding the ordinary rate limit value RLNR to the final target engine rotational speed NESPRN from the preceding execution of the control loop does not satisfy NESPF≦NESPRN+RLNR.

After point f, the ratio control by the schedule is executed.

Due to this, the rate limit value RL at the time of the transient control is changed to the first rate limit value RLTR1 or the second rate limit value RLTR2 in accordance with the throttle opening degree THR and the vehicle velocity NCO which are input to the control unit 84. The first transient control THTR1 or the second transient control THTR2 is performed.

As described in detail above, according to the invention, there is provided a control unit which receives the throttle opening degree and the vehicle velocity and performs the speed change control so as to change the final target engine rotational speed. Therefore, the rate limit value at the time of the transient control is changed in accordance with the throttle opening degree and the vehicle velocity which are input to the control unit. The throttle opening degree when executing the transient control is changed on the basis of the vehicle velocity. The timer values TTRI1 and TTRI2 of the transient control are set on the basis of the throttle opening degree and the vehicle velocity. The final target engine rotational speed at the time of the transient control is changed on the basis of the rate limit value.

The invention is not limited to the above embodiments but many variations and modifications are possible.

For instance, in the disclosed embodiments of the invention, the explanation has been made with respect to the case where the throttle transient control THTR is divided into two first and second throttle transient controls THTR1 and THTR2 and the relation between the rate limit value and the longest time of the throttle transient control is set to one combination. However, it is possible to execute three or more throttle transient controls. The combination between the rate limit value and the longest time of the throttle transient control can be also set to various combinations.

As described in detail above, the throttle transient control can be performed in a wider throttle opening degree range. Also, the proper throttle transient control adapted to the running state of the vehicle can be accomplished.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a method of controlling a continuous variable transmission including a fixed pulley member and a movable pulley member which is supported relative to the fixed pulley member so as to be movable toward and away from the fixed pulley member, including the steps of decreasing and increasing the width of a groove between the pulley members to thereby respectively increase and decrease the rotational radius of a belt which is received between the pulley members in the groove, and in the case where there occurs a change in a target engine rotational speed which is calculated on the basis of a vehicle velocity and a throttle opening degree during vehicle running, executing a speed change control so as to change a belt ratio by executing a rate limit control on the basis of a predetermined rate limit value, the improvement comprising the steps of providing a control unit, using the control unit for (1) receiving the vehicle velocity and the throttle opening degree, (2) executing a throttle transient control so as to change a final target engine rotational speed on the basis of a rate limit value larger than the predetermined rate limit value, and (3) starting the throttle transient control in the case where (a) an actual throttle opening degree is equal to or larger than a throttle opening degree trigger value which is determined by the vehicle velocity and the throttle opening degree, and (b) a change speed of the throttle opening degree is equal to or larger than a throttle opening degree change speed trigger value.

2. In a method of controlling a continuous variable transmission, in which a fixed pulley member and a movable pulley member which is supported relative to the fixed pulley member so as to be able to move toward and away from the fixed pulley member are provided including the steps of decreasing and increasing the width of a groove between the pulley members to thereby respectively increase and decrease a rotational radius of a belt which is received between the pulley members in said groove and when a target engine rotational speed based on a throttle opening degree and a vehicle velocity changes during vehicle running, performing a transient speed change control so as to change a belt ratio based on a predetermined rate limit value, the improvement comprising the steps of providing a control unit which receives the throttle opening degree and the vehicle velocity and executes the transient speed change control so as to change the final target engine rotational speed, changing the rate limit value at the time of the transient control in accordance with the throttle opening degree and the vehicle velocity which are input to the control unit, changing the throttle opening degree during the transient control on the basis of the vehicle velocity, setting a time limit for execution of the transient control on the basis of the throttle opening degree and the vehicle velocity, changing the final target engine rotational speed during transient control on the basis of the rate limit value, and executing a proper speed change control adapted to the running state of the vehicle.

* * * * *